United States Patent
Chae et al.

(10) Patent No.: US 11,219,025 B2
(45) Date of Patent: Jan. 4, 2022

(54) METHOD BY WHICH D2D TERMINAL TRANSMITS RS FOR PDOA IN WIRELESS COMMUNICATION SYSTEM AND DEVICE THEREFOR

(71) Applicant: LG Electronics Inc., Seoul (KR)

(72) Inventors: Hyukjin Chae, Seoul (KR); Myeongjin Kim, Seoul (KR); Sangrim Lee, Seoul (KR)

(73) Assignee: LG Electronics Inc., Seoul (KR)

(*) Notice: Subject to any disclaimer, the term of this patent is extended or adjusted under 35 U.S.C. 154(b) by 3 days.

(21) Appl. No.: 16/608,101

(22) PCT Filed: Apr. 24, 2018

(86) PCT No.: PCT/KR2018/004750
§ 371 (c)(1),
(2) Date: Oct. 24, 2019

(87) PCT Pub. No.: WO2018/199599
PCT Pub. Date: Nov. 1, 2018

(65) Prior Publication Data
US 2020/0100237 A1    Mar. 26, 2020

Related U.S. Application Data

(60) Provisional application No. 62/489,423, filed on Apr. 24, 2017.

(51) Int. Cl.
*H04W 72/04* (2009.01)
*H04L 5/00* (2006.01)

(52) U.S. Cl.
CPC ......... *H04W 72/048* (2013.01); *H04L 5/0051* (2013.01)

(58) Field of Classification Search
CPC ....... H04W 72/048; H04W 4/46; H04W 4/44; H04W 4/027; H04W 4/70; H04W 4/00;
(Continued)

(56) References Cited

U.S. PATENT DOCUMENTS 9,491,020 B2 * 11/2016 Han ...................... H04L 5/0041
9,509,542 B1 * 11/2016 Patel ................ H04W 72/0446
(Continued)

FOREIGN PATENT DOCUMENTS

WO    WO2017048064    3/2017

OTHER PUBLICATIONS

Ericsson, "On DL PTRS Design," R1-1705906, 3GPP TSG-RAN WG1 #88bis, Spokane, WA, USA, dated Apr. 3-7, 2017, 11 pages.
(Continued)

*Primary Examiner* — Magdi Elhag
(74) *Attorney, Agent, or Firm* — Fish & Richardson P.C.

(57) ABSTRACT

Provided in various embodiments are a method by which a D2D terminal transmits a reference signal (RS) for a PDoA in a wireless communication system, and a device therefor. Disclosed are a method by which a D2D terminal transmits a reference signal (RS) for a PDoA, and a device therefor, the method comprising the steps of: determining, on the basis of the maximum value of a difference between indexes of subcarriers of a resource block for the transmission of a reference signal (RS), an index set for RS mapping among preconfigured index sets; mapping the RS to the subcarriers of the resource block having indexes corresponding to each of the indexes included in the index set for the RS mapping; and transmitting the resource block to which the RS is mapped, wherein the preconfigured index sets include indexes in which differences between two pairs of indexes are not the same for each number of indexes.

7 Claims, 20 Drawing Sheets

(58) Field of Classification Search
CPC .............. H04L 5/0051; H04L 27/2613; H04L 27/2646; H04L 5/0033; H04L 5/14; H04L 5/0048; H04L 5/0094; H04L 5/0023
See application file for complete search history.

(56) References Cited

U.S. PATENT DOCUMENTS

| | | | | |
|---|---|---|---|---|
| 2009/0116599 | A1* | 5/2009 | McCoy | H04L 5/0064 375/362 |
| 2010/0284265 | A1* | 11/2010 | Ogawa | H04J 13/22 370/208 |
| 2012/0319903 | A1 | 12/2012 | Huseth et al. | |
| 2013/0182692 | A1* | 7/2013 | Dai | H04L 1/0028 370/336 |
| 2014/0198675 | A1* | 7/2014 | He | H04L 5/14 370/252 |
| 2016/0013906 | A1* | 1/2016 | Guo | H04L 5/0073 370/329 |
| 2016/0112172 | A1* | 4/2016 | Seo | H04L 5/0053 370/329 |
| 2016/0112173 | A1* | 4/2016 | Wang | H04L 5/0048 370/329 |

OTHER PUBLICATIONS

National Instruments, "Discussion on Signaling for PT-RS," R1-1705253, 3GPP TSG RAN WG1 Meeting #88bis, Spokane, USA, dated Apr. 3-7, 2017, 10 pages.
Oshiga et al., "Superresolution Multipoint Ranging With Optimized Sampling via Orthogonally Designed Golomb Rulers," EEE Transactions on Wireless Communications, vol. 15, No. 1, dated Aug. 20, 2015, 18 pages.
PCT International Search Report and Written Opinion in International Application No. PCT/KR2018/004750, dated Aug. 9, 2018, 15 pages (with English translation).

* cited by examiner (a)

(b)

(a)

(b)

METHOD BY WHICH D2D TERMINAL TRANSMITS RS FOR PDOA IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2018/004750, filed on Apr. 24, 2018, which claims the benefit of U.S. Application No. 62/489,423, filed on Apr. 24, 2017. The disclosures of the prior applications are incorporated by reference in their entirety.

TECHNICAL FIELD

The present disclosure relates to a wireless communication system, and more particularly, to a method for mapping a reference signal (RS) for phase difference of arrival (PDoA) in a user equipment (UE) and transmitting the RS and a device therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An object of the present disclosure is to provide a method and device for mapping a reference signal (RS) by determining an optimal subcarrier, which can make sure of diversity of measurement according to combination of various frequencies and SNR at the same time, in mapping the RS for measuring a distance between UEs according to a phase difference of arrival (PDoA) in a D2D UE of a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to one aspect of the present disclosure, a method by which a D2D UE transmits a reference signal (RS) for a PDoA in a wireless communication system comprises determining an index set for RS mapping, among preconfigured index sets based on a maximum value of a difference between indexes of subcarriers included in a resource block for RS transmission, mapping the RS into the subcarriers of the resource block having an index corresponding to each of indexes included in the index set for RS mapping, and transmitting the resource block into which the RS is mapped, wherein the preconfigured index set includes indexes in which differences between two pairs of indexes are not the same for each number of indexes.

According to one example, the preconfigured index sets are previously set based on a Golomb ruler.

The preconfigured index sets include indexes having the shortest index length which is a maximum value of a difference between indexes among indexes in which differences between two pairs of indexes are not the same for each number of indexes.

The index set for RS mapping is an index set having the longest index length among indexes having the index length which is less than a maximum value of a difference between the subcarrier indexes included in the resource block in the preconfigured index sets.

The preconfigured index sets include indexes having a difference between indexes corresponding to all positive integers less than an index length for each number of indexes.

The subcarriers of the resource block corresponding to each of the indexes included in the index set for RS mapping are included in one symbol.

The D2D UE repeatedly performs RS mapping by frequency shifting per symbol included in the resource block.

The subcarriers of the resource block having an index corresponding to each of the indexes included in the index set for RS mapping are distributed into at least two or more symbols.

At least one of the subcarriers of the resource block corresponding to each of the indexes included in the index set for RS mapping is repeated for at least two symbols and therefore the RS is mapped into the corresponding subcarrier.

The number of symbols into which the subcarriers of the resource block having an index corresponding to each of the indexes included in the index set for RS mapping is varied depending on a moving speed of the D2D UE.

The subcarriers of the resource block having an index corresponding to each of the indexes included in the index set for RS mapping are distributed into two or more symbols in accordance with indication of a base station.

An index set having four indexes in the preconfigured index sets includes indexes of 0, 1, 4 and 6.

The subcarriers of the resource block having an index corresponding to each of the indexes included in the index set having four indexes are 0th, 1st, 4th and 6th subcarriers in the resource block.

The subcarriers of the resource block having an index corresponding to each of the indexes included in the index set for RS mapping are not included in at least one of the first symbol and the last symbol of the resource block.

Advantageous Effects

A method and device for mapping a reference signal (RS) for measuring a distance between UEs according to a phase difference of arrival (PDoA) in a D2D UE of a wireless communication system may map the RS by determining an optimal subcarrier, which can make sure of diversity of measurement according to combination of various frequencies and SNR at the same time.

It will be appreciated by persons skilled in the art that that the effects that can be achieved through the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE INVENTION

Figure 1:
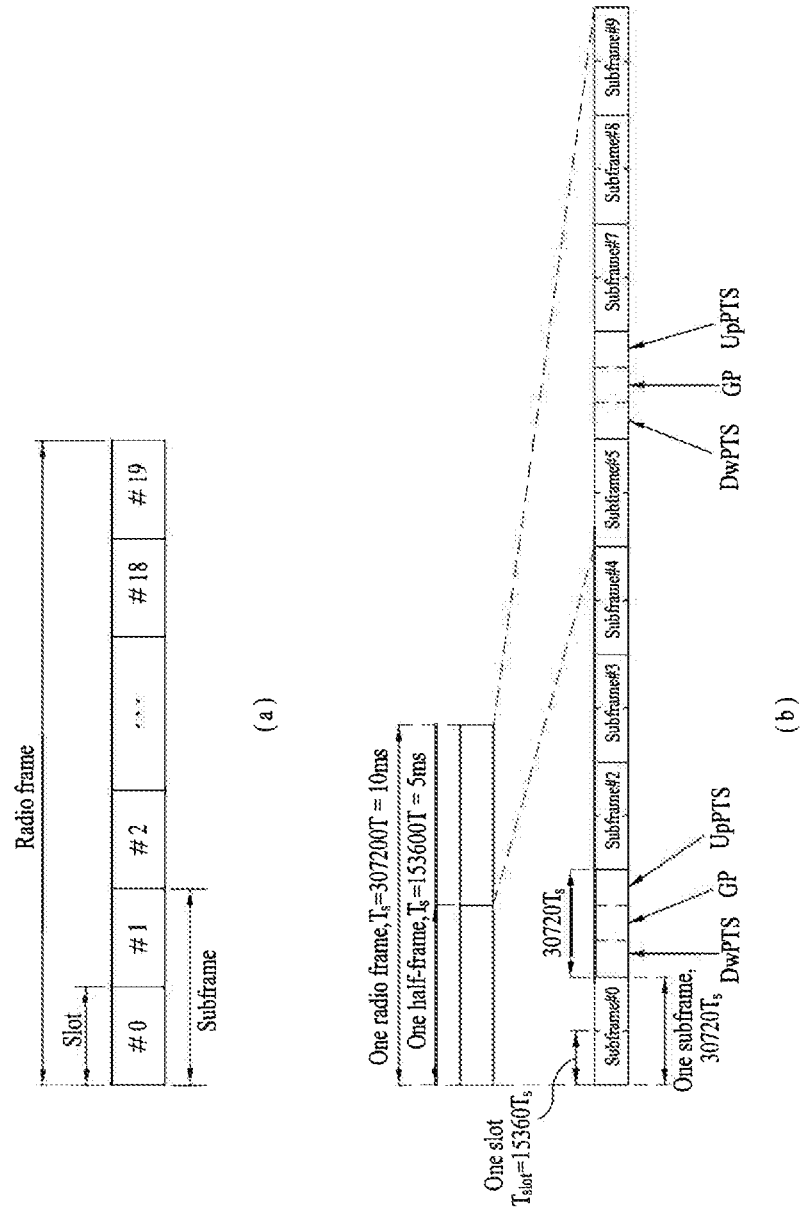
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
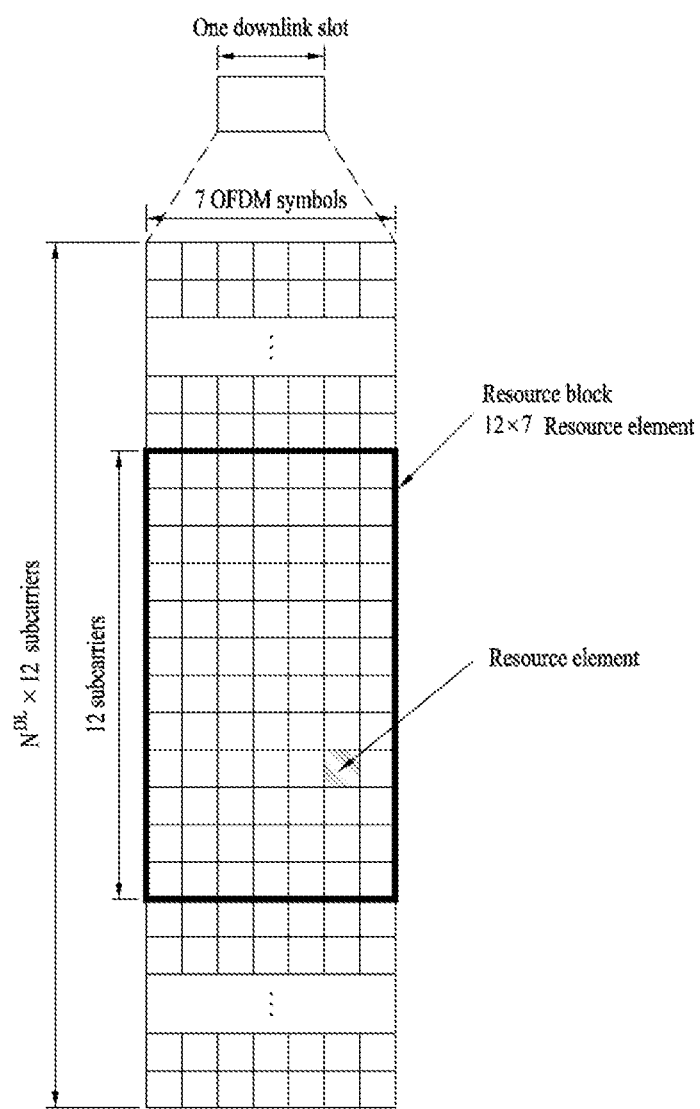
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
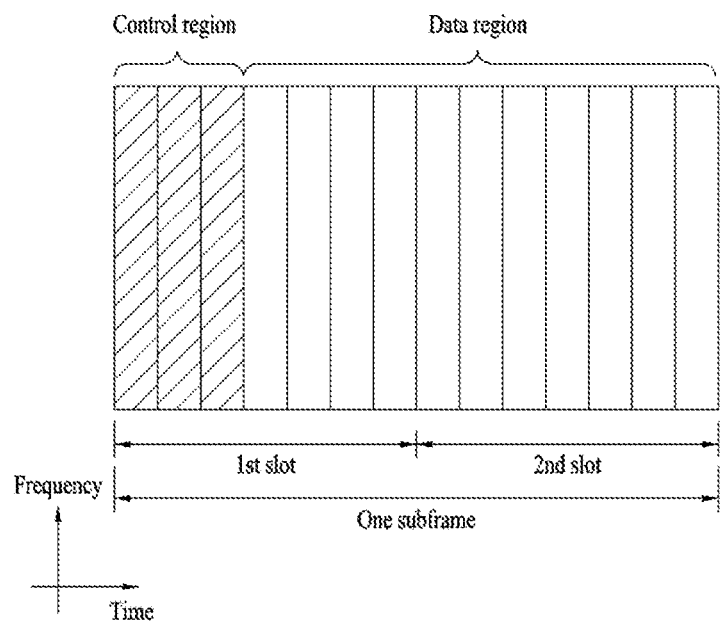
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
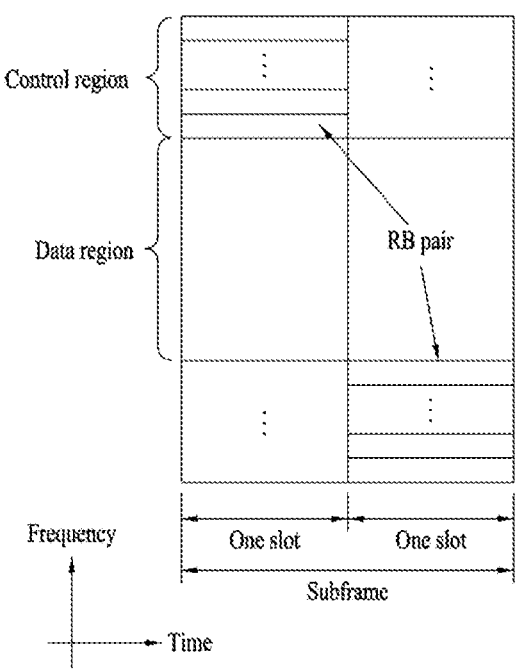
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:
  i) Demodulation-reference signal (DM-RS) used for channel estimation for coherent demodulation of information delivered on a PUSCH and a PUCCH; and
  ii) Sounding reference signal (SRS) used for an eNB or a network to measure the quality of an uplink channel in a different frequency.

The downlink RSs are categorized into:
  i) Cell-specific reference signal (CRS) shared among all UEs of a cell;
  ii) UE-specific RS dedicated to a specific UE;
  iii) DM-RS used for coherent demodulation of a PDSCH, when the PDSCH is transmitted;
  iv) Channel state information-reference signal (CSI-RS) carrying CSI, when downlink DM-RSs are transmitted;
  v) Multimedia broadcast single frequency network (MBSFN) RS used for coherent demodulation of a signal transmitted in MBSFN mode; and
  vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
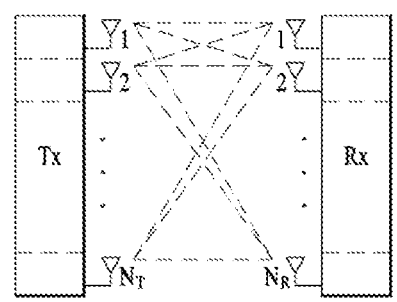
FIG. 5 is a view illustrating the configuration of a wireless communication system having multiple antennas.
Figure 5:
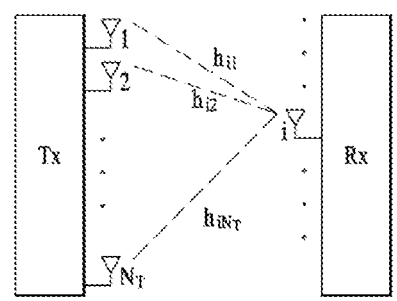

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$S = [S_1, S_2, \ldots, S_{N_T}]^T \quad \text{[Equation 2]}$$

Meanwhile, transmit powers can be set different from each other for individual pieces of transmission information $S_1, S_2, \ldots, S_{N_T}$, respectively. If the transmit powers are set to, respectively, the transmission information with adjusted transmit powers can be represented as Equation 3.

$$\hat{S} = [\hat{S}_1, \hat{S}_2, \ldots, \hat{S}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ Tx antenna and $j^{th}$ information. W is also called a precoding matrix.

If the $N_R$ Rx antennas are present, respective received signals $y^1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R$ $N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
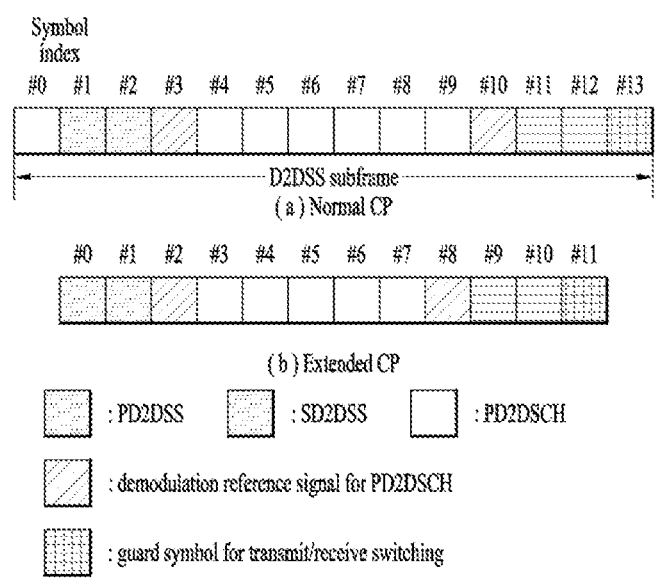
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
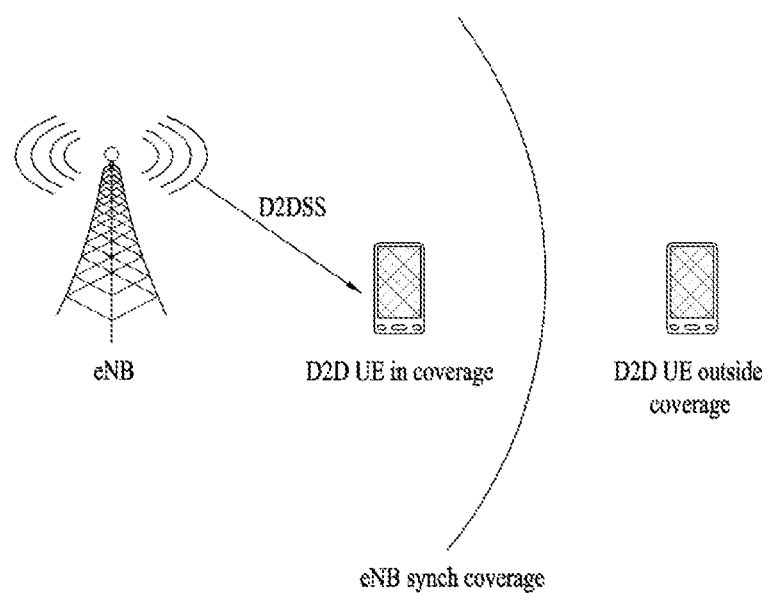
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
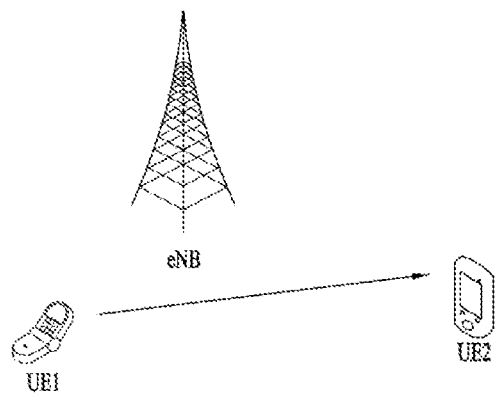
FIG. 8 is a view illustrating an exemplary D2D resource pool for D2D.
Figure 8:
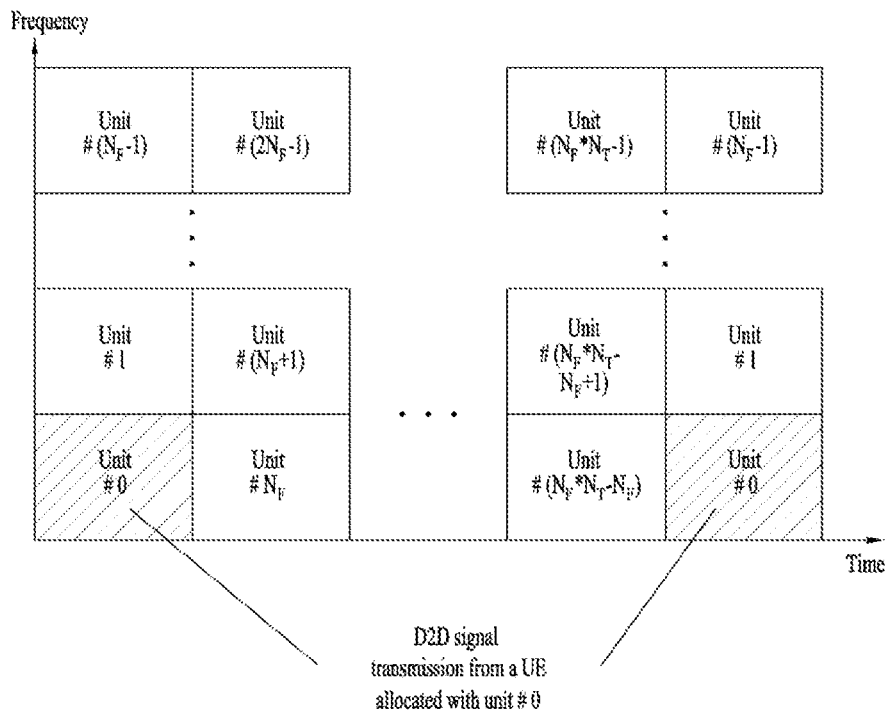

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the NF number of resource units and the entire time resources are divided into the $N_T$ number of resource units. In particular, it is able to define NF*$N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmitting UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmitting UE is referred to as a mode 1 (mode 3 in case of V2X). If a transmission resource region is configured in advance or an eNB designates the transmission resource region and a UE directly selects a transmission resource from the transmission resource region, it is referred to as a mode 2 (mode 4 in case of V2X). In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (D2D control signal, or sidelink control information (SCI)) in resources configured by an eNB. For a mode-2 UE, the eNB configures resources for D2D transmission. The mode-2 UE may select time-frequency resources from the configured resources and transmit an SA in the selected time-frequency resources.

Figure 9:
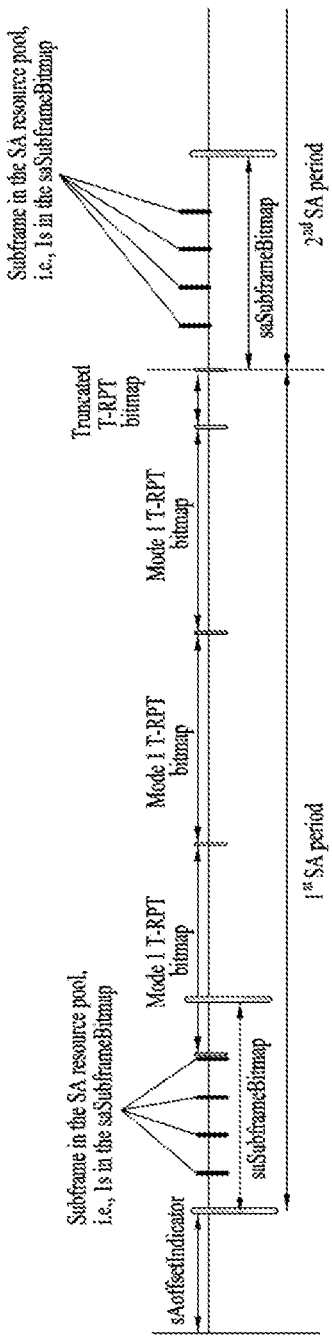
FIG. 9 is a view illustrating a scheduling assignment (SA) period.

An SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be truncated to be as long as the number of remaining subframes. A transmitting UE performs transmission at positions corresponding to 1s set in a T-RPT bitmap in an indicated T-RPT, and transmits one medium access control layer protocol data unit (MAC PDU) four times.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

Figure 10:
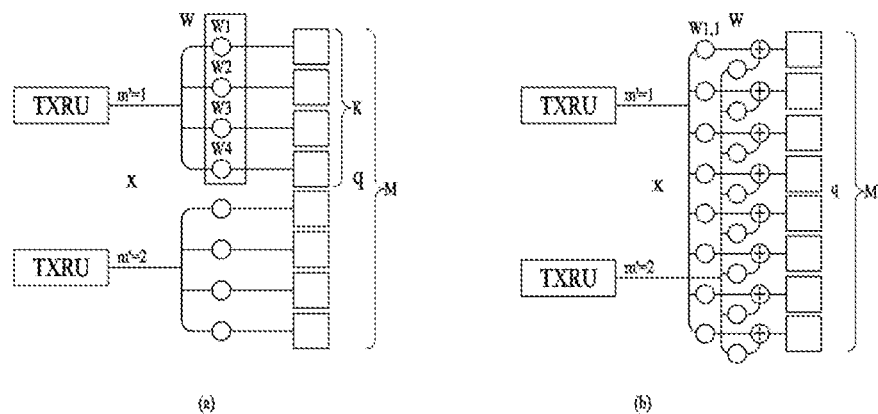
FIG. 10 illustrates examples of a connection scheme between TXRUs and antenna elements.

FIG. 10 illustrates examples of a connection scheme between TXRUs and antenna elements.

FIG. 10(a) illustrates that TXRU is connected to a sub-array. In this case, the antenna elements are connected to only one TXRU. Unlike FIG. 10(a), FIG. 10(b) illustrates that TXRU is connected to all antenna elements. In this case, the antenna elements are connected to all TXRUs. In FIG. 10, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present disclosure.

Figure 11:
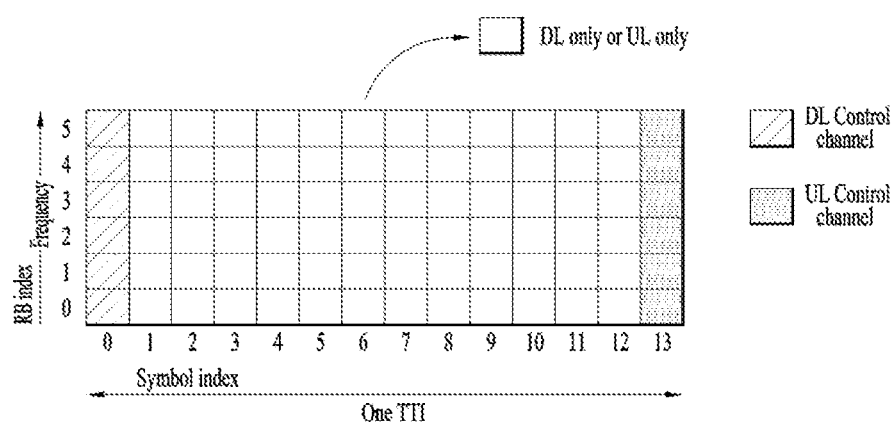
FIG. 11 illustrates an example of a self-contained subframe structure.

A self-contained subframe structure shown in FIG. 11 is considered in the fifth generation NewRAT to minimize data transmission latency in a TDD system. FIG. 11 illustrates an example of a self-contained subframe structure.

In FIG. 11, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period downlink control period+downlink data period downlink control period+GP+uplink data period+uplink control period downlink control period+GP+uplink data period In 5G NewRAT, a signal transmissions scheme may differ according to services or requirements. For example, a transmission time unit of enhanced mobile broadband (eMBB) may be relatively long and a transmission time unit of ultra-reliable and low latency communication (URLLC) may be relatively short.

According to a service type, particularly, in the case of an urgent service, a URLLC signal may be transmitted on a corresponding resource even in the middle of eMBB transmission. Accordingly, in terms of a network or a UE, URLLC transmission may consider preemption of a partial transmission resource of eMBB.

In this case, a part of a transmission resource of eMBB having a relatively long transmission time unit may be punctured due to the preemption and an eMBB signal may be modified because the eMBB signal is superimposed on another signal such as the URLLC signal.

When URLLC transmission preempts a partial resource of eMBB transmission, there is a high possibility that the UE fails to decode a specific code block (CB) of eMBB transmission. Particularly, this situation may cause decoding failure for a specific CB even when a channel state is good. Therefore, 5G NewRAT may consider performing retransmission in a CB unit, rather than in a transport block (TB) unit.

Beamforming in mmW

Meanwhile, in a millimeter wave (mmW), a wavelength is shortened, and thus a plurality of antenna elements may be installed in the same area. Specifically, a total of 64 (=8×8) antenna elements may be installed in a 4-by-4 cm panel in a 30 GHz band with a wavelength of about 1 cm in a 2-dimensional array at intervals of 0.5 lambda (wavelength). Therefore, in the recent trend of the mmW field, increasing coverage or throughput by increasing beamforming (BF) gain using multiple antenna elements has been taken into consideration.

In this case, if a transceiver unit (TXRU) is provided for each antenna element to enable adjustment of transmit power and phase, independent BF is possible for each frequency resource. However, installing TXRU in all of the about 100 antenna elements is less feasible in terms of cost. Therefore, a method of mapping multiple antenna elements into one TXRU and adjusting the direction of a beam using an analog phase shifter is under consideration. This analog BF method may make only one beam direction in the full band, and thus may not perform frequency selective BF, which is disadvantageous.

Hybrid BF using B TXRUs less in number than Q antenna elements may be considered as an intermediate type of digital BF and analog BF. In this case, the number of beam directions in which beams may be transmitted at the same time is limited to B or less, which depends on a connection method of B TXRUs and Q antenna elements.

Reference Signal for Device Ranging Based on Phase Difference of Arrival

PDoA (Phase difference of arrival) based ranging is a method for measuring a a distance between UEs by detecting a difference between two phases in a receiver based on signals transmitted from different frequencies. In this case, since a phase difference for more samples may be detected for more combinations of frequency intervals at different frequencies, measurement diversity for various frequency combinations may be obtained.

For example, the distance between UEs may be measured through signals transmitted from two tones in accordance with the following Equation.

$$d = \frac{c\Delta\theta}{4\pi\Delta f}$$

In this case, $\Delta\theta$ is a phase difference of two tones, $\Delta f$ is a frequency difference of two tones, and c means a velocity constant of light.

If the signals of the multiple tones are transmitted, the phase difference according to the above Equation or the distance value 'd' between UEs may respectively be calculated for each combination of the tones, and an average weighted value may be obtained for the respectively calculated distance values 'd' (or phase difference values), whereby measurement diversity may be obtained.

Meanwhile, if the UE transmits more tones to obtain measurement diversity of PDOA through combination of several tones, a problem may occur in that the phase difference between the tones is not measured normally due to distribution of a transmission power per tone. Unlike this case, if signals are transmitted from only two tones to obtain a signal-to-noise ratio (SNR) per tone, measurement diversity is not obtained, whereby exactness of distance measurement between UEs may be deteriorated. That is, in order to obtain SNR per tone and at the same time obtain measurement diversity, it is required to determine optimal tones that can make more combinations of frequency intervals if possible. Hereinafter, methods for determining optimal tones that can make more combinations of frequency intervals if possible will be suggested.

Embodiment 1

According to one embodiment, a UE may transmit reference signals (RS) for PDoA from REs arranged at constant intervals on a frequency. In this case, a repetition factor and a comb index may be signaled by a network to a transceiving UE through a physical layer signal or a higher layer signal. The network may adjust at least one of the repetition factor and the comb index in accordance with a network status or measurement values such as SNR, CQI (channel quality Indicator), SINR(signal-to-interference plus noise ratio), RSRP(Reference Signal Received Power), RSRQ (Reference Signal Received Quality), and RSSI(Received Signal Strength Indicator) of the UE, and then may indicate the adjusted one to the UE. For example, the network may indicate a relatively great repetition factor to a UE having a low SNR to make sure of SNR per tone, and may indicate a low repetition factor to a UE having a high SNR to make sure of diversity between tones. Meanwhile, in order to extremely make sure of diversity if possible, the RS may be transmitted from all the tones. In this case, the repetition factor indicates a subcarrier interval between REs when a comb type RS is mapped into the REs.

The comb index (or frequency shift) may be set differently per cell, UE, or UE group. For example, UE1 may use comb index=0, and UE2 may use comb index=1, whereby RSs of various UEs/BSs may be subjected to multiplexing within the same RB.

Figure 12A:
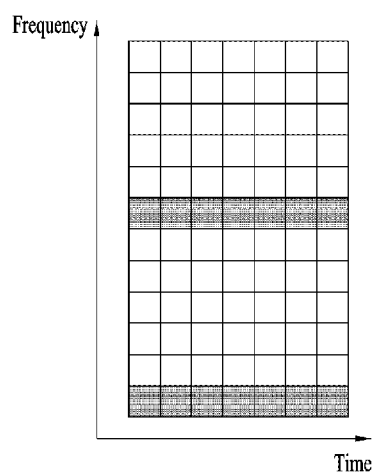
FIGS. 12(a) and 12(b) illustrate an example of a method for mapping by frequency shifting RS for PDoA in one slot per symbol.
Figure 12B:
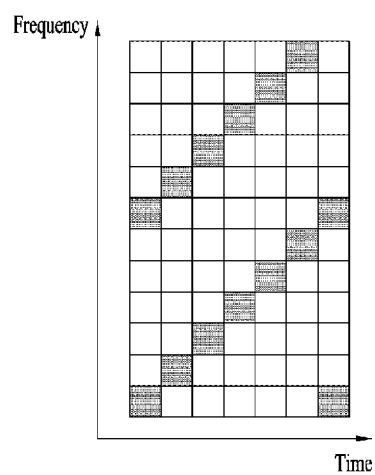

When RS for PDoA is transmitted from several symbols, a frequency shift value may be set differently per symbol. FIG. 12(a) illustrates that the same frequency shift value is applied to the symbols when RS for PDoA is transmitted from one slot, and FIG. 12(b) illustrates that a frequency shift value is set differently per symbol.

The RS for PDoA may be transmitted to only some symbols within a slot or subframe. For example, the RS for PDoA may be transmitted from the other symbols except the first symbol or the last symbol. That is, since the first symbol is used for AGC(Automatic Gain Control) tuning and the last symbol is used as a gap for Tx/Rx switching in a sidelink, transmission of the RS for PDoA from the first symbol or the last symbol is not appropriate.

The RS for PDoA may be transmitted from only some set symbols and set frequency domain without being transmitted from all the symbols. For example, the RS for PDoA may be transmitted within a band through which a sidelink discovery signal is transmitted to each UE. Alternatively, the network may signal a frequency domain to which the RS for PDoA is transmitted to each UE or UE group through a physical layer signal or a higher layer signal.

The UE may select a specific frequency domain as a band for transmitting the RS for PDoA. In this case, a resource region to which RS for positioning or ranging is transmitted may be configured by the network, or may previously be determined.

The comb index in the frequency domain may be set differently per RB. This setup may previously be determined, may be signaled by the network through the physical layer signal or the higher layer signal, or may be selected by the UE.

When the UE transmits the RS for PDoA from the REs arranged at constant intervals on the frequency, the interval between REs transmitted within symbols is equally applied to all symbols. In this case, measurement for various frequency combinations may be performed by RS comparison between symbols. However, this method needs an assumption that the same channel is maintained between the symbols, and it is likely to increase an error in measurement of a distance between the UEs if a phase noise is different per symbol.

Meanwhile, the aforementioned methods for arranging the RS for PDoA may be applied to the following embodiments.

Embodiment 2

According to one embodiment, the UE may transmit the RS for PDoA by using a mark in a Golomb Ruler (GR). In this case, the Golomb ruler is a set of marks at integer positions an imaginary ruler such that no two pairs of marks are the same distance apart. The number of marks on the ruler is its order, and the largest distance between two of its marks is its length. There is no requirement that a Golomb ruler be able to measure all distances up to its length, but if it does, it is called a perfect Golomb ruler. It has been proven that no perfect Golomb ruler exists for five or more marks. A Golomb ruler is optimal if no shorter Golomb ruler of the same order exists.

In the present disclosure, a subcarrier index of a transport block for transmission of the RS may be determined based on the marks of the Golomb ruler, and the RS for PDoA may be mapped into REs located in a specific subcarrier index and a specific symbol based on the marks of the Golomb ruler.

Figure 13:
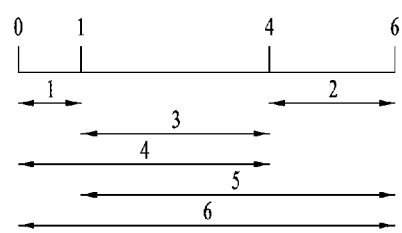
FIG. 13 illustrates an optimal perfect Golomb ruler having a length of 6.

FIG. 13 illustrates an optimal perfect Golomb ruler having a length of 6. Referring to FIG. 13, all combinations for distances from 1 to 6 may be made by four points. If the RS is transmitted by mapping based on this method, SNR gain corresponding to 7/4 of a case that all REs are used for seven subcarriers may be obtained to make all combinations corresponding to each RE in each RE. Also, while the SNR gain corresponding to 7/4 may be obtained, PDoA measurement may be performed for the same number of combinations.

Meanwhile, the marks of the golomb ruler may correspond to subcarrier indexes, and marks of a specific number of golomb rulers for a specific length may correspond to an index set including a specific number of indexes. For example, an index set corresponding to a case that marks according to a GR having a length of 6 are 0, 1, 4 and 6 may include indexes of 0, 1, 4 and 6. That is, an index set including four indexes of 0, 1, 4 and 6 may be considered to correspond to marks corresponding to a GR having four marks (or length of 6). In this case, the index corresponds to the subcarrier index. Hereinafter, for convenience of description, the description will be given based on that the marks of the golomb ruler and the set of the marks correspond to the indexes and the set of the indexes.

Figure 14A:
FIG. 14(a) illustrates an example of mapping RS for PDoA within one RB by referring to a Golomb ruler having a length of 6.
Figure 14B:
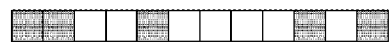
FIG. 14(b) illustrates an example of mapping RS for PDoA into one RB of a length of 11 in accordance with a preconfigured pattern in consideration of GR having a length of 11.

FIG. 14(a) illustrates an example of mapping RS for PDoA within one RB by referring to a Golomb ruler of a length of 6. In this way, if RS is mapped into the 0th, the 1st, the 4th and 6th subcarriers within one RB, PDoA measurement for a total of 6 combinations may be performed. Similarly, what length of a GR may be considered within a bandwidth given for RS transmission of PDoA to configure the preset pattern may be signaled by the network through a physical layer signal or a higher layer signal. Meanwhile, FIG. 14(b) illustrates an example of mapping RS for PDoA into one RB of a length of 11 in accordance with a preset pattern in consideration of GR of a length of 11.

When RB size for RS transmission for PDoA is N, the following method may be considered for selection of GR (or index set) for RS mapping for PDoA transmitted from one symbol.

One (for example, the longest GR length smaller than or equal to the number of subcarriers within M sized RB) of GR of the longest length within M sized RB (M<N) may be selected, and RB into which the RS for PDoA is mapped may repeatedly be transmitted in the frequency domain in consideration of the selected GR.

One (for example, the longest GR length smaller than or equal to the number of subcarriers within N sized RB) of GR of the longest length within N sized RB may be selected, and RB into which the RS for PDoA is mapped may repeatedly be transmitted in the frequency domain in consideration of the selected GR.

One (for example, the longest GR length smaller than or equal to the number of subcarriers within M sized RB) of GR that can be transmitted within M sized RB may be selected within N sized RB, and RB into which the RS for PDoA is mapped may repeatedly be transmitted in the N sized RB in consideration of the selected GR. For example, M may be equal to 1 (M=1). This method may assume that a channel is flat using a GR in a possible narrow band, and may be repeated in several RBs to obtain frequency domain diversity. Meanwhile, at least one of M and N may previously be determined, or may be a value signaled by the network. A subcarrier index to which RS is transmitted within the N or M sized RB may be a subcarrier of a position indicated by the marks of Table 1, or may be a subcarrier of a position indicated by a value obtained by multiplying a certain constant by a value indicated by the marks. At this time, the constant may previously be determined. If the constant is 12, a minimum subcarrier interval may be RB basis (12 subcarriers). That is, the RS may be subjected to mapping on an RB basis.

If the RS for PDoA is transmitted to several OFDM symbols, frequency shift per OFDM symbol may sequentially be increased, or may be determined in consideration of a specific pattern. The specific pattern may be determined by cell ID or UE ID, or may be determined by a value signaled by the network to the UE. Alternatively, the UE may use the same RS mapping for a response to another UE, or may determine the specific pattern by itself.

Figure 15A:
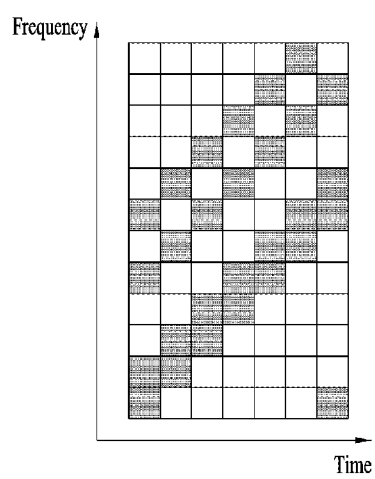
FIG. 15(a) illustrates an example of a method for mapping RS for PDoA in the 0th, 1st, 4th and 6th subcarriers based on a GR having a length of 6 and transmitting the RS from several symbols by frequency (circular) shifting the RS per symbol based on the mapped result.
Figure 15B:
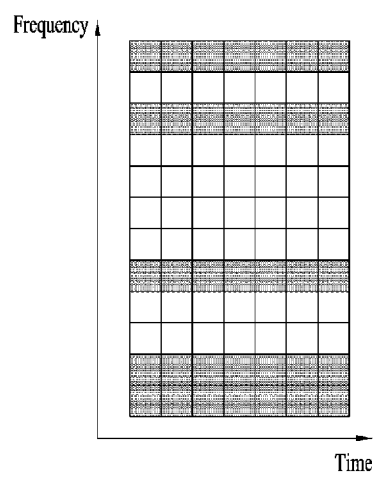
FIG. 15(b) illustrates an example of a method for mapping RS for PDoA based on a GR having a length of 11 and transmitting the RS from several symbols without frequency shifting.

FIG. 15(a) illustrates an example of a method for mapping RS for PDoA in the 0th, 1st, 4th and 6th subcarriers based on a GR having a length of 6 and transmitting the RS from several symbols by frequency (circular) shifting the RS per symbol based on the mapped result, and FIG. 15(b) illustrates an example of a method for mapping RS for PDoA based on a GR having a length of 11 and transmitting the RS from several symbols without frequency shifting.

Table 1 is a table illustrating an example of an optimal GR per length (or order of marks).

TABLE 1

| Order | Length | Marks |
|---|---|---|
| 1 | 0 | 0 |
| 2 | 1 | 0 1 |
| 3 | 3 | 0 1 3 |
| 4 | 6 | 0 1 4 6 |
| 5 | 11 | 0 1 4 9 11 |
|  |  | 0 2 7 8 11 |
| 6 | 17 | 0 1 4 10 12 17 |
|  |  | 0 1 4 10 15 17 |
|  |  | 0 1 8 11 13 17 |
|  |  | 0 1 8 12 14 17 |
| 7 | 25 | 0 1 4 10 18 23 25 |
|  |  | 0 1 7 11 20 23 25 |
|  |  | 0 1 11 16 19 23 25 |
|  |  | 0 2 3 10 16 21 25 |
|  |  | 0 2 7 13 21 22 25 |
| 8 | 34 | 0 1 4 9 15 22 32 34 |
| 9 | 44 | 0 1 5 12 25 27 35 41 44 |
| 10 | 55 | 0 1 6 10 23 26 34 41 53 55 |
| 11 | 72 | 0 1 4 13 28 33 47 54 64 70 72 |
|  |  | 0 1 9 19 24 31 52 56 58 69 72 |
| 12 | 85 | 0 2 6 24 29 40 43 55 68 75 76 85 |
| 13 | 106 | 0 2 5 25 37 43 59 70 85 89 98 99 106 |
| 14 | 127 | 0 4 6 20 35 52 59 77 78 86 89 99 122 127 |
| 15 | 151 | 0 4 20 30 57 59 62 76 100 111 123 136 144 145 151 |
| 16 | 177 | 0 1 4 11 26 32 56 68 76 115 117 134 150 163 168 177 |
| 17 | 199 | 0 5 7 17 52 56 67 80 81 100 122 138 159 165 168 191 199 |

Figure 16A:
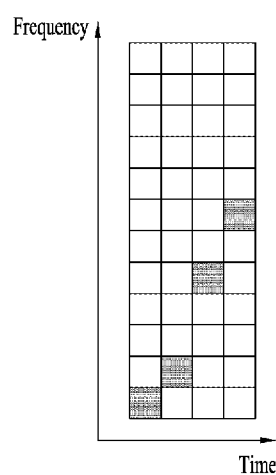
FIGS. 16(a) and 16(b) illustrate an example of a method for transmitting marks according to a GR having a length of 6 by being divided into four or two OFDM symbols.
Figure 16B:
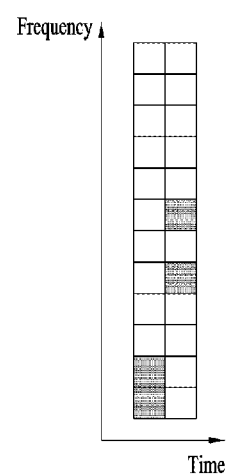

According to one embodiment, points marking the Golomb ruler may be transmitted by being divided into several symbols without being transmitted from one symbol. In this case, the number of marks transmitted from each symbol may previously be determined, or may be indicated by the network. This method enables SNR per high tone by concentrating a power on some subcarriers in one symbol and may obtain measurement diversity of PDoA through combinations between marks from several symbols. However, if the UE quickly moves and the marks are distributed into several symbols, channel change may occur, whereby exactness of measurement of PDoA between the marks may be deteriorated. To avoid this, the number of marks transmitted to one symbol or the number of several symbols into which the marks are distributed may be determined differently depending on a speed of the UE. Alternatively, this parameter may be signaled by the network. FIGS. 16(a) and 16(b) illustrate an example of a method for transmitting marks according to a GR having a length of 6 by being divided into four or two OFDM symbols.

The aforementioned embodiment has been described based on that the marks selected based on the Golomb ruler are transmitted by being distributed into several symbols. In this case, some of the marks may repeatedly be transmitted from several symbols. This is to enhance exactness of PDoA measurement according to combination with some marks within one symbol even though the UE quickly moves and reduce the number of symbols to which the marks according to one Golomb ruler are all transmitted.

Figure 17A:
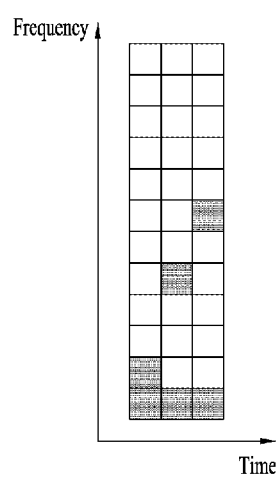
FIGS. 17(a) and 17(b) illustrate an example that some marks are repeatedly transmitted from several symbols when RS is mapped using a Golomb ruler having a length of 6.

FIG. 17(a) illustrates an example that the 0th mark is repeatedly transmitted from several symbols when RS is mapped using a Golomb ruler having a length of 6. In this case, in comparison with FIG. 16(a), it is noted that the number of symbols is reduced from 4 to 3.

Figure 17B:
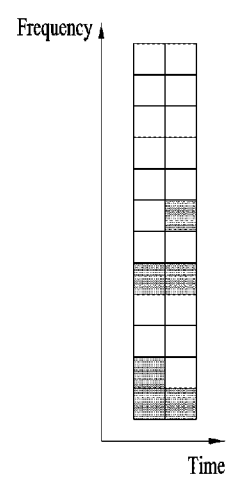

In this case, a plurality of marks may repeatedly be transmitted, and may previously be determined d or indicated by the network. FIG. 17(b) illustrates that marks corresponding to the GR having a length of 6 are transmitted by being divided into two symbols, wherein the 0th mark and the 4th mark are repeatedly transmitted to the two symbols.

Embodiment 3

According to one embodiment, when the RS for PDoA is transmitted from several symbols, the RS may be configured in each symbol by applying shift between different tones to each symbol. For example, if the RS is transmitted from the 0th and 1st REs at symbol #0, the RS may be transmitted from the 0th and 2nd REs at symbol #1. This method may maximize SNR gain per tone in each symbol and at the same time obtain measurement diversity by achieving spacing between different tones between symbols.

Figure 18:
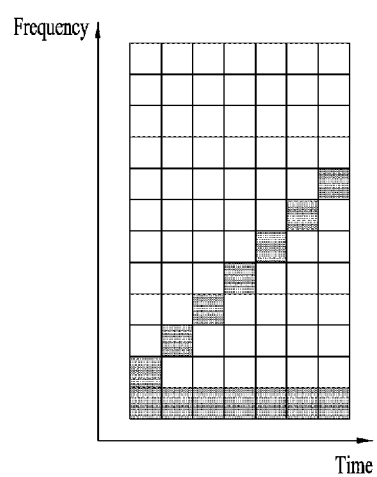
FIG. 18 illustrates an example of configuring RS different per symbol within one RB.

FIG. 18 illustrates an example of configuring RS different per symbol within one RB.

Figure 19A:
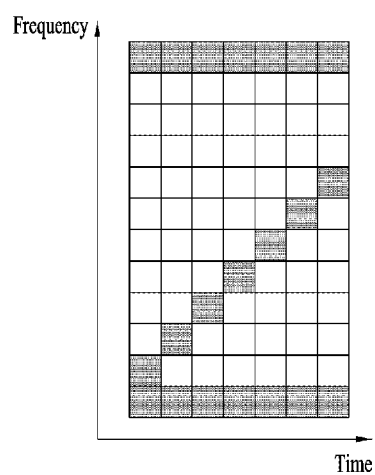
FIGS. 19(a) and 19(b) illustrate that RS is repeatedly transmitted by from 0th subcarrier and 11th subcarrier of each symbol.
Figure 19B:
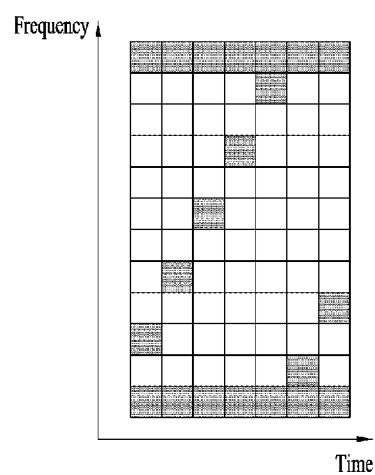

Referring to FIG. 18, a transmission position of a specific tone is maintained at several symbols, and may substitute for a phase noise tracking RS (PTRS). In this way, when the specific tone is repeatedly transmitted at several symbols, a plurality of specific tones not one specific tone may be provided. For example, as shown in FIGS. 19(a) and 19(b), the RS may repeatedly be transmitted from the 0th subcarrier and the 11th subcarrier of each symbol.

Figure 20A:
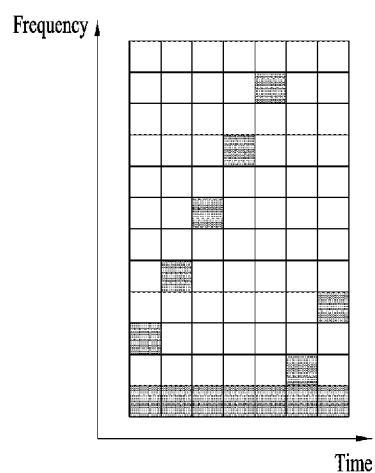
FIG. 20a illustrates an example of a method for increasing a tone interval in each symbol as much as 2.
Figure 20B:
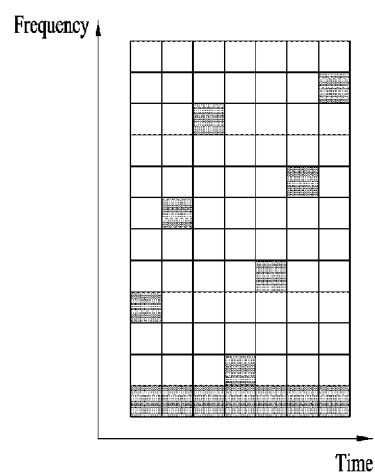
FIG. 20(b) illustrates an example of a method for increasing a tone interval in each symbol as much as 3.

FIG. 20a illustrates an example of a method for increasing a tone interval in each symbol as much as 2, and FIG. 20(b) illustrates an example of a method for increasing a tone interval in each symbol as much as 3.

Figure 21:
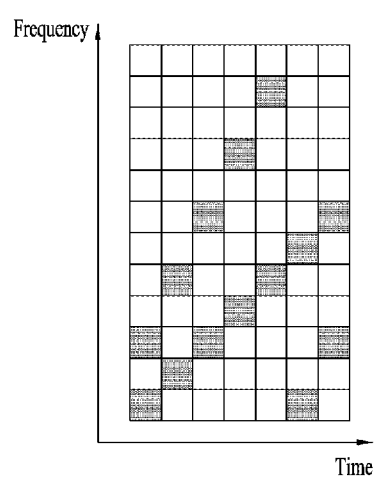
FIG. 21 illustrates an example of a method for changing an RE position into which RS is mapped per symbol.

FIG. 21 illustrates an example of a method for changing an RE position into which RS is mapped per symbol without maintaining a position between symbols in a specific RE.

Referring to FIG. 21, two RSs are arranged per symbol to correspond to two straight lines having different slopes. In this case, maximum diversity may be obtained between symbols. This method may be extended such that the RS may be arranged to have N number of different slopes. In this case, three tones may be transmitted to one symbol at different frequency intervals. N may previously be determined, or may be a value signaled by the network.

In the aforementioned embodiments, time and frequency intervals between RSs for PDoA may be limited to a value less than a certain threshold value. This is to prevent an error of PDoA from being increased by differently applying phase rotation components of a channel due to a frequency selective channel if frequencies are excessively spaced apart from each other. For example, in the aforementioned embodiments, a maximum GR length or a maximum comb index may previously be limited to a specific value, or may be indicated by the network to the UE through a physical layer signal or a higher layer signal, or may be determined by the UE by identifying channel characteristics of peripheral UEs. If the UE determines the maximum GR length or the maximum comb index by itself, information on RS pattern may be signaled to another UE by a physical layer signal or a higher layer signal.

In the aforementioned embodiments, although regions other than the RS may be processed as null to improve measurement exactness of the RS, the RS for PDoA may be used for data demodulation. In this case, phase rotation between RSs or RS sequence may previously be determined, or the UE may signal sequence information to another UE through a physical layer signal or a higher layer signal.

Although the above suggested method has been described based on one slot, the RS for PDoA may be transmitted on a subframe basis, or may be transmitted on a symbol basis or a symbol group basis.

A time unit of the RS to which PDoA is transmitted may previously be determined, or may be signaled by the network. Combination of the aforementioned embodiments is also included in the embodiment of the present disclosure. For example, some symbols may be transmitted in accordance with the method of the embodiment 1, and the other symbols may be transmitted in accordance with the method of the embodiment 2. For example, in 1 RB symbols, for performance, a power is concentrated on two tones in a specific symbol, and diversity for maximum distance resolution may be obtained through multi-tones according to the Golomb ruler in the other symbols.

Meanwhile, the present disclosure is not limited to only D2D direct communication, and may be used even in an uplink or a downlink. At this time, the BS or the relay node may use the aforementioned suggested method. Since the examples according to the aforementioned suggested method may be included as one of the implementation methods of the present disclosure, it will be apparent that the examples may be regarded as the suggested methods. Also, the aforementioned suggested methods may be implemented independently, but may be implemented in the form of combination (or incorporation) of some of the suggested methods. A rule may be defined such that information (or information on rules of the suggested methods) as to application of the suggested methods is notified by the BS to the UE through a previously defined signal (e.g., physical layer signal or higher layer signal).

The aforementioned embodiment 2 will be described again as follows.

According to one embodiment, if RS mapping for PDoA is performed, an index set may previously be set in consideration of an optimal golomb ruler (GR) shown in Table 1 to make combination of subcarriers for measuring PDoA at various frequency intervals. As described above, the preset index set may include a specific number of indexes corresponding to marks of the golomb ruler per length (or the number of marks) of the golomb ruler. Moreover, considering the optimal GR, the index set may include a specific number of indexes corresponding to marks of the golomb ruler corresponding to a specific length and a specific number, and indexes having a maximum value (or index length) between the indexes. For example, if the marks according to the optimal GR having a length of 6 are 0, 1, 4 and 6, the index set may include indexes of 0, 1, 4 and 6.

In this case, the optimal GR includes a specific number of marks (corresponding to Order of the GR) in which a difference between a pair of marks is not the same as a difference between another pair of marks (or first condition), and is the GR having the shortest length among the GRs that include marks equivalent to the specific number of marks satisfying the first condition. In this way, the optimal index set includes indexes a specific number of indexes (corresponding to Order of the GR) in which a difference between a pair of indexes is not the same as a difference between another pair of indexes (or first condition), and is the index set having the shortest length among the index sets that include indexes equivalent to the indexes satisfying the first condition. For example, if the number of indexes included in the optimal index set is 4, the index length is 6, indexes of 0, 1, 4 and 6 may be included to correspond to GR marks having a length of 6. In this case, 0, 1, 4 and 6 are indexes having the shortest index distance among the index sets having four indexes satisfying the first condition.

Meanwhile, in the optimal index set, the number of indexes corresponds to a length of each index in a one to one relationship. If the number of indexes is determined by a specific number, the index length may be determined as a specific length. On the other hand, if the index length is determined as a specific length, the number of indexes is also determined as a specific number. Hereinafter, it is assumed that the index set described later for convenience of description means an optimal index set.

According to one embodiment, the UE may determine an index set for RS mapping among preset index sets based on a maximum value (or transport block length) of a difference between subcarrier indexes of a transport block for the RS transmission. In detail, the preset index set includes index sets corresponding to the length of the index or the number of indexes. The UE may determine the index set having the longest length (or including the largest number of indexes) among the index sets having a length shorter than the transport block length.

For example, if the maximum value of the difference between subcarrier indexes in the transport block for the RS transmission is 14, the number of indexes of the index set and an index length may be determined as 5 and 11 to correspond to the order and the length of the optimal GR having a length of 11 in Table 1. In this case, the UE may determine an index set including any one of five indexes of 0, 1, 4, 9 and 11 and 0, 2, 7, 8 and 11, each of which has a length of 11, as an index set for RS mapping.

Also, the preset index set may be an index set corresponding to a perfect GR. As described above, the perfect GR includes marks that may measure lengths of positive integers shorter than a GR length. Therefore, the index set corresponding to the marks includes indexes having a difference between the indexes corresponding to all positive integers shorter than the index length.

Next, if the index set for RS mapping is determined, the UE may select a subcarrier (or subcarriers for RS mapping) of the resource block having an index corresponding to each of the indexes included in the index set as a subcarrier for RS mapping. In this case, a symbol to which a subcarrier index corresponds in the resource block may previously be determined, or may be determined by the higher layer signal or the physical layer signal of the BS. For example, the subcarrier index corresponding to the index set including indexes of 0, 1, 4 and 6 may be determined by the 0th subcarrier, the 1st subcarrier, the 4th subcarrier and 6th subcarrier of the second symbol.

Also, the UE may include subcarriers (subcarriers for RS mapping) of the resource block having an index corresponding to each of the indexes included in the index set for RS mapping in one symbol of the resource block. In this case, the UE may perform RS mapping for the subcarriers for RS mapping with respect to one symbol. Alternatively, the UE may repeatedly map the subcarriers for RS mapping into a plurality of symbols when RS mapping is performed for the resource block as shown in FIG. 15(b) or may repeatedly map the subcarriers into a plurality of symbols as shown in FIG. 15(a) through frequency shifting per symbol.

Alternatively, the UE may distribute and map the subcarriers for RS mapping into a plurality of symbols. For example, if the subcarriers for RS mapping are determined as the 0th subcarrier, the 1st subcarrier, the 4th subcarrier and 6th subcarrier, the UE may perform RS mapping for the 1st subcarrier and the 4th subcarrier of the second symbol, perform RS mapping for the 0th subcarrier of the third symbol, and perform RS mapping for the 6th subcarrier of the fourth symbol. Meanwhile, a symbol into which a corresponding one of the subcarriers for RS mapping is mapped may previously be determined, or may be indicated by the BS. Also, the UE may determine how many symbols into which the subcarriers for RS mapping are distributed and mapped, based on a speed of the UE.

Next, the UE may transmit a signal, which includes the resource block into which the RS is mapped, to the subcarrier of the determined symbol corresponding to the index set for the RS. The UE which has received the signal may exactly measure a distance with the UE which has transmitted the signal by calculating a phase difference according to the frequency difference based on various combinations between subcarriers into which the RS is mapped.

Figure 22:
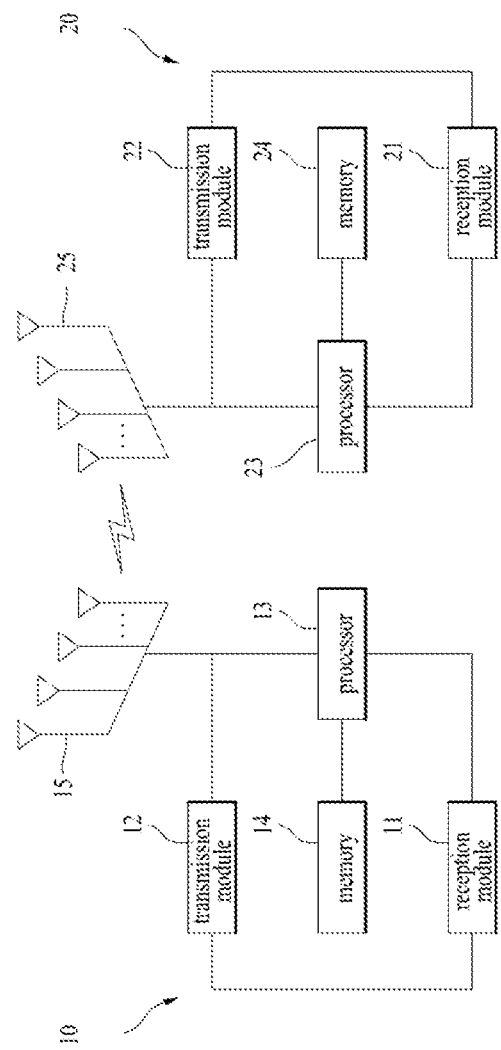
FIG. 22 is a diagram schematically illustrating a UE performing D2D communication.

FIG. 22 is a diagram schematically illustrating a terminal performing D2D communication.

With continued reference to FIG. 22, a UE 20 according to the present disclosure may include a receiver 21, a transmitter 22, a processor 23, a memory 24, and a plurality of antennas 15. Use of the plurality of antennas 25 means that the UE 20 supports MIMO transmission and reception. The receiver 21 may receive various DL signals, data, and information from an eNB. Or/and receiver 21 may transmit a D2D signal (sidelink signal) to the other UE. The transmitter 22 may transmit various UL signals, data, and information to an eNB. Or/and transmitter 22 may transmit a D2D signal (sidelink signal) to the other terminal. The processor 23 may provide overall control to the UE 20.

The processor 23 of the UE 20 according to an embodiment of the present disclosure can process the necessary items in each of the above-described embodiments.

The processor 23 of the UE 20 may also perform a function of computationally processing information received by the UE 20 and information to be transmitted to the outside, and the memory 24 may store the computationally processed information and the like for a predetermined time and may be replaced by a component such as a buffer (not shown)

The specific configuration of the transmission point apparatus and the UE may be implemented such that the details described in the various embodiments of the present disclosure may be applied independently or implemented such that two or more of the embodiments are applied at the same time. For clarity, redundant description is omitted In the example of FIG. 22, the description of the transmission point apparatus 10 may also be applied to a relay device as a downlink transmission entity or an uplink reception entity, and the description of the UE 20 may also be applied to a relay device as a downlink reception entity or an uplink transmission entity The embodiments of the present disclosure may be implemented through various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method by which a device-to-device user equipment (D2D UE) transmits a reference signal (RS) for a phase difference of arrival (PDoA) in a wireless communication system, the method comprising:
mapping a plurality of RSs into a resource block; and
transmitting the plurality of RSs in the resource block,
wherein the D2D UE determines indexes of frequency subcarriers to which the plurality of RSs are to be mapped based on the number of frequency subcarriers included in the resource block,
wherein based on the number of frequency subcarriers included in the resource block being at least 6 and less than 11, the indexes of the frequency subcarriers are determined as n, n+1, n+4, and n+6,
wherein based on the number of frequency subcarriers included in the resource block being at least 11 and less than 17, the indexes of the frequency subcarriers are determined as n, n+2, n+7, n+8, and n+11, and
wherein n is the lowest index among the indexes of the frequency subcarriers in the resource block.

2. The method of claim 1, wherein the indexes of the frequency subcarriers to which the plurality of RSs are to be mapped are pre-configured based on a Golomb ruler.

3. The method of claim 1, wherein the D2D UE repeatedly performs RS mapping by frequency shifting per orthogonal frequency division multiplexing (OFDM) symbol included in the resource block.

4. The method of claim 1, wherein the plurality of RSs are distributed in at least two or more OFDM symbols among a plurality of OFDM symbols included in the resource block.

5. The method of claim 4, wherein the number of OFDM symbols to which the plurality of RSs are distributed is determined based on a moving speed of the D2D UE.

6. The method of claim 1, wherein the plurality of RSs are not mapped to a first OFDM symbol among a plurality of OFDM symbols included in the resource block.

7. A device-to-device user equipment (D2D UE) for transmitting a reference signal (RS) for phase difference of arrival (PDoA) in a wireless communication system, the D2D UE comprising:
a transceiver; and
a processor configured to perform operations comprising:
mapping a plurality of RSs into a resource block; and
transmitting the plurality of RSs in the resource block by controlling the transceiver,
wherein the D2D UE determines indexes of frequency subcarriers to which the plurality of RSs are to be mapped based on the number of frequency subcarriers included in the resource block,
wherein based on the number of frequency subcarriers included in the resource block being at least 6 and less than 11, the indexes of the frequency subcarriers are determined as n, n+1, n+4, and n+6,
wherein based on the number of frequency subcarriers included in the resource block being at least 11 and less than 17, the indexes of the frequency subcarriers are determined as n, n+2, n+7, n+8, and n+11, and
wherein n is the lowest index among the indexes of the frequency subcarriers in the resource block.

* * * * *